(12) United States Patent
Dixon et al.

(10) Patent No.: US 11,573,801 B1
(45) Date of Patent: Feb. 7, 2023

(54) METHOD AND APPARATUS FOR EXECUTING VECTOR INSTRUCTIONS WITH MERGING BEHAVIOR

(71) Applicant: Advanced Micro Devices, Inc., Santa Clara, CA (US)

(72) Inventors: Eric Dixon, Fort Collins, CO (US); Erik Swanson, Fort Collins, CO (US); Theodore Carlson, Fort Collins, CO (US); Ruchir Dalal, Buda, TX (US); Michael Estlick, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/489,301

(22) Filed: Sep. 29, 2021

(51) Int. Cl.
*G06F 9/38* (2018.01)
*G06F 9/48* (2006.01)
*G06F 9/30* (2018.01)

(52) U.S. Cl.
CPC ............ *G06F 9/384* (2013.01); *G06F 9/3013* (2013.01); *G06F 9/30036* (2013.01); *G06F 9/4881* (2013.01)

(58) Field of Classification Search
None
See application file for complete search history.

(56) References Cited

U.S. PATENT DOCUMENTS

| 2014/0129804 A1* | 5/2014 | King | G06F 9/30109 |
| | | | 712/30 |
| 2015/0089191 A1* | 3/2015 | Gonion | G06F 9/30036 |
| | | | 712/7 |
| 2021/0042123 A1* | 2/2021 | Thangam | G06F 9/3836 |

* cited by examiner

*Primary Examiner* — John M Lindlof

(57) ABSTRACT

A processor includes a register file and control logic that detects multiple different sets of sequential zero bits of a register in the register file, wherein each of the multiple different sets has a bit length that corresponds to a partial instruction width and operates at a first partial instruction width or a second partial instruction width with the register file depending on number of sets of zero bits detected in the register. In certain examples, the control logic causes operating at first instruction width that avoids merging of a first bit length of data in the register and operating at the second instruction width that avoids merging of a second bit length of data in the register. In some examples, a register rename map table incudes multiple zero bits that identify the detected multiple different sets of bits of sequential zeros.

20 Claims, 5 Drawing Sheets

| ARCHITECTURAL REGISTER | PHYSICAL REGISTER NUMBER | ZY (511:128) | ZZ (511:256) |
|---|---|---|---|
| R0 | PRN40 | 1 | 1 |
| R1 | PRN7 | 0 | 1 |
| R2 | PRN100 | 0 | 0 |
| ... | ... | | |

FIG. 3

METHOD AND APPARATUS FOR EXECUTING VECTOR INSTRUCTIONS WITH MERGING BEHAVIOR

BACKGROUND OF THE DISCLOSURE

Processors employ various structures to store data for use during processing activities. One type of data structure is a register file. The typical register file stores data in functional latches that are associated with an entry that may be written to or read from in parallel. Processor architectures, such as x86 architectures support execution of multiple types of vector arithmetic instructions: Streaming Single Instruction Multiple Data (SIMD) Extensions (SSE) and Advanced Vector eXtension (AVX) Instructions. SSE instructions manipulate 128-bit operands and AVX instructions manipulate 256-bit operands. AVX-512 instructions are 512-bit extensions to the 256-bit AVX SIMD instructions for X86 instructions set architecture (ISA). Accordingly, a processor that employs a register file with a 512-bit register width supports extension of both AVX and SSE instructions.

Some processors employ a shadow-latch configured floating point register file that employs register files with 256-bit registers that also supports 512-bit operations. Such shadow-latch register files include a storage latch, shadow latch and shadow multiplexer configuration to allow processing units in a processor, such as floating point units or other processing units, to process instructions that have different bit width operands. For example, such shadow-latch based register files are reconfigurable so that the register file employs registers with a bit width such as a 256-bit width or a 512-bit width based on the availability of shadow latches in a shadow-latch configured register file. As such, the floating point unit operates at a first bit width that is usable in a processor that operates at a second bit width. The shadow latches, regular latches and shadow select multiplexers that are used for bit width configuration during, for example, read and write data operations that utilize the floating point unit.

When processor employ different types of operand widths, merging of results in a register file is employed. For example, the SSE instructions have a merging behavior that allows the instructions to merge results into the upper bits of a 512-bit register. For example, when an add operation occurs for a 512-bit wide operation, a value is kept at the upper 384 bits. A 128-bit operation is allowed to use the lower 128-bits of the 512-bit register. As such, the result is merged so that the upper 384-bits of the registers are preserved and the 128-bit result from a current 128-bit operation is placed in the lower 128-bits of the register.

Also, architectural registers are renamed during arithmetic operations. However, with register renaming, the previous results of the register are put into a new physical register and the processor needs to write the 384-bits that are in the initial register to the new physical register to get full 512-bit operation. This can use additional power and processing time. Every time a write is made to a register, the processor assigns a new register and the information has to be copied. When changing from one instruction width to another, inefficiencies cause unnecessary power usage and can reduce performance.

BRIEF DESCRIPTION OF THE DRAWINGS

The implementations will be more readily understood in view of the following description when accompanied by the below figures, wherein like reference numerals represent like elements, and wherein:

FIG. 3 is a diagram illustrating an example of a register rename map table in accordance with one example set forth in the disclosure;

Figure 1:
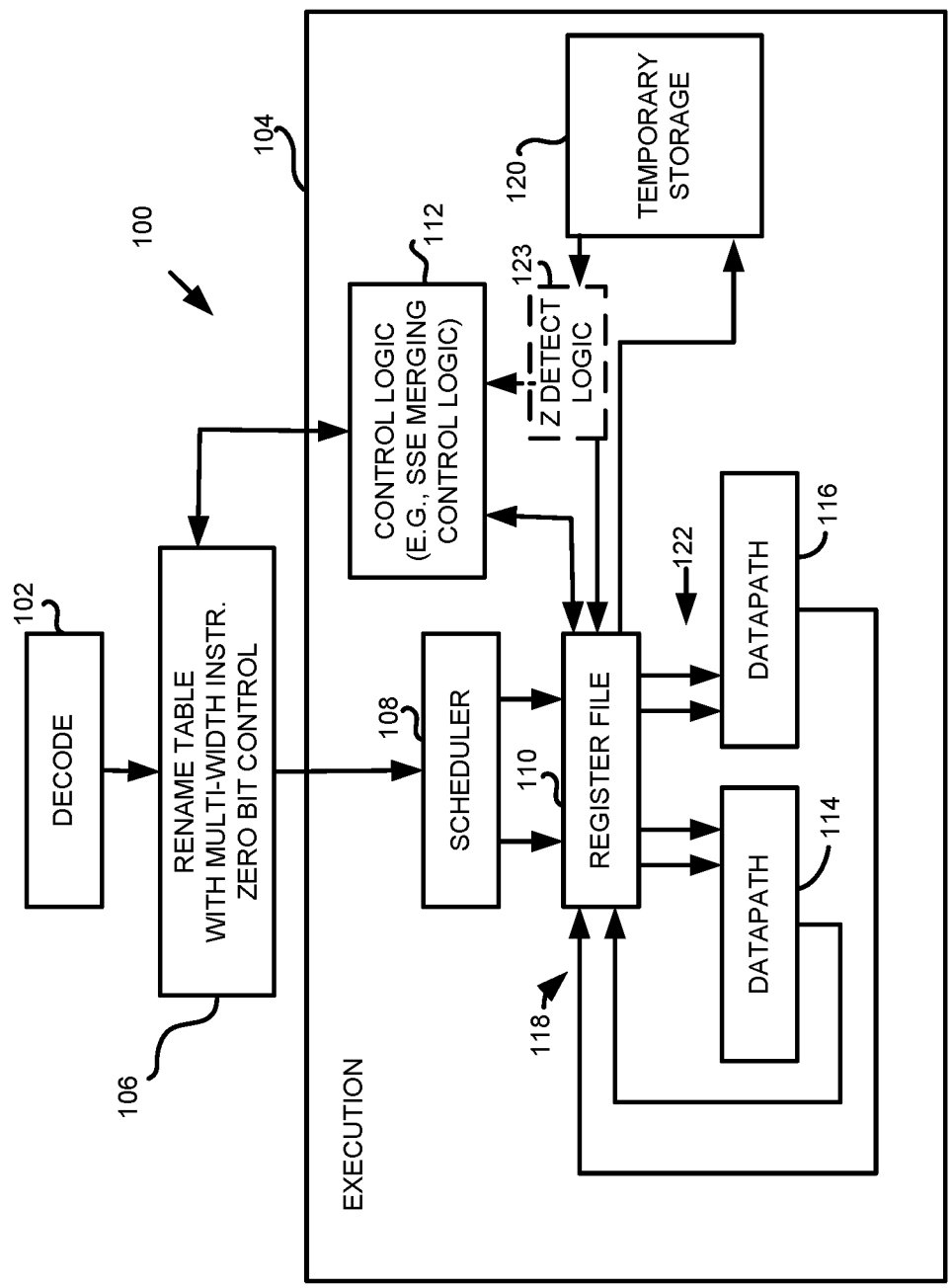
FIG. 1 is a block diagram illustrating one example of a processor in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Briefly, methods and apparatus execute vector instructions with merging behavior in a processor that has one or more execution pipelines that supports different bit width operations. In some implementations, the processor employs a shadow-latch based register file and employs a register rename map table that includes multiple zero data values each indicating whether different sets of sequential zero bits of a register in a register file have been detected to indicated which register bit width should be used. In some implementations, the processor operates at a first partial instruction width or a second partial instruction width with the register file depending on the number of sets of sequential zero bits detected in the register as indicated by the multiple zero data values. The first and second partial instruction widths are different from each other and less than a full width instruction. In some implementations, different sets of sequential zeros is based on an operation width or a function of a last write operation to the register.

In some examples, a partial instruction width is 128 bits, another partial instruction width is 256 bits and a full instruction width is 512 bits. However, any suitable bit lengths may be employed. As such, a rename map table includes multi-width instruction zero (Z) bit control. In one example there are two zero bits, each bit is used for a detection of sequential zeros for differing bit widths so that merging can be avoided depending upon which Z bit is set. One or more technical benefits include that operation executions can be done faster. For example, shorter width operations can be done faster and in some implementations the shadow latch register file structure is used to more efficiently accommodate reconfiguring the register file to support bit width changes depending upon the instruction type.

In some implementations, a method for executing vector instructions with merging behavior includes detecting multiple different sets of sequential zero bits of a register in a register file, and operating at a first partial instruction width or a second partial instruction width with the register file depending on the number of sets of sequential zero bits detected in the register, wherein the first and second partial instruction widths are different from each other and less than a full width instruction. Each of the multiple different sets has a bit length that corresponds to a partial instruction width.

In certain examples, operating at first instruction width includes avoiding merging of a first bit length of data in the register and wherein operating at the second instruction width avoids merging of a second bit length of data in the register.

In some examples, detecting multiple different sets of sequential zero bits of the register in the register file includes determining an operation width of a last write operation to the register and based on the last operation width or based on a function of the last operation, setting zero bits of a register rename map table wherein the zero bits identify the detected multiple different sets of bits of sequential zeros.

In certain examples, generating a register rename map table includes first zero data representing whether sequential zeros were detected corresponding to the first instruction width and second zero data representing whether sequential zeros were detected corresponding to the second instruction width and using the first and second zero data to operate with the register file in a manner that either merges results or does not merge results depending on a value of the first and second zero data.

In some examples, generating the register rename map table includes generating map table data indicating a plurality of architectural register identifiers, a physical register identifier mapped to each of the plurality of architectural register identifiers and for each of the plurality of architectural registers, first zero data representing whether sequential zeros were detected corresponding to the first instruction width and second data representing whether sequential zeros were detected corresponding to the second instruction width.

In certain examples, multiple different sets of bits include a first set of 128 bits, a second set of 256 bits and wherein the full width instruction is 512 bits. In some implementations the control logic detects multiple different sets of bits from the temporary memory when data is restored to the register file from the temporary memory.

In some implementations, a processor includes a register file and control logic that detects multiple different sets of bits of a register in the register file containing sequential zero bits and operates at a first partial instruction width or a second partial instruction width with the register file depending on number of sets of zero bits detected in the register, wherein the first and second partial instruction widths are different from each other and less than a full width instruction.

In certain examples, the control logic causes operating at first instruction width that avoids merging of a first bit length of data in the register and operating at the second instruction width that avoids merging of a second bit length of data in the register.

In some examples, a register rename map table and wherein the control logic is detects multiple different sets of sequential zero bits of the register in the register file by determining an operation width of a last write operation to the register and based on the last operation width, setting zero bits of the register rename map table wherein the zero bits identify the detected multiple different sets of bits of sequential zeros.

In certain examples, a processor includes a register rename map table and control logic that generates the register rename map table that includes first zero data representing whether sequential zeros were detected corresponding to the first instruction width and second zero data representing whether sequential zeros were detected corresponding to the second instruction width, and uses the first and second zero data to operate with the register file in a manner that either merges results or does not merge results depending on a value of the first and second zero data.

In some examples, the control logic generates the register rename map table that includes map table data indicating a plurality of architectural register identifiers, a physical register identifier mapped to each of the plurality of architectural register identifiers and for each of the plurality of architectural registers, first zero data representing whether sequential zeros were detected corresponding to the first instruction width and second zero data representing whether sequential zeros were detected corresponding to the second instruction width.

In certain examples, the control logic moves data from a renamed register to temporary memory (storage) external to the register file when the zero bits of the register rename map table indicate that there are non-zero bits in both sets of bits and a first bit width instruction is scheduled to execute and return data to the register file from the temporary memory in response to the zero bit indicating instruction widths larger than the first bit width instruction are scheduled to execute.

In certain implementations, a processor includes a floating point unit (FPU) configured to operate at a plurality of different instruction widths, the FPU including a floating point register file, a register rename map table, control logic that detects multiple different sets of sequential zero bits of a register in the floating point register file containing sequential zero bits by determining an operation width of a last write operation to the register and/or based on the last write operation width, setting zero bits of the register rename map table wherein the zero bits identify the detected multiple different sets of bits of sequential zeros, and operates at a first partial instruction width or a second partial instruction width with the floating point register file depending on the zero bits in the register rename map table, wherein the first and second partial instruction widths are different from each other and less than a full width instruction.

FIG. 1 illustrates one example of a processor 10 that employs a processor core 100 that in this example, supports the x86 architecture that supports extension of the two types of vector arithmetic instructions such as SSE and AVX instructions. As noted above, the SSE instructions manipulate 128-bit operands, AVX instructions manipulate 256-bit operands and AVX-512 instructions are 512 bit extensions to the 256 bit AVX SIMD instructions. However, any suitable processor core and instructions may be employed. In some implementations, the processor core 100 employs a floating point unit and floating point register file that is configured as a shadow latch register file of the type for example as described in US Publication 2021/0096862, filed on Sep. 27, 2019 having Ser. No. 16/585,817 entitled Bit Width Reconfiguration Using a Shadow-Latch Configured Register File, owned by instant assignee and incorporated herein by reference. However, other register file configurations may also be employed. In some implementations, by utilizing the shadow-latch register file structure, the processor 10, processor core or processing unit employs a register file with 128 bit operation that also supports 256 bit operation and 512 bit operations.

In the depicted example, the processor core 100 employs an execution pipeline that includes an instruction cache (not shown), a decode unit 102, an execution unit 104 that executes operations of differing bit widths as described herein. The processor 10 also includes a stored data structure, in this example a rename map table 106 with multi-width instruction zero bit (Z-bit) control. In some implementations, the processor also includes a load store unit, coupled to a memory hierarchy that includes one or more levels of cache (e.g., L1 cache, L2 cache, etc.), a system memory such as a system RAM, and one or more mass storage devices, such as a solid state drive or an optical drive, or other mass storage device if desired.

In this example, the execution unit 104 includes an instruction scheduler 108, a register file 110 that includes physical registers, control logic 112 and multiple data paths 114 and 116 that provide results from the pipeline to the register file as indicated by arrows 118. As further described below, temporary storage 120 is used, in some implementations to store spill data that is stored in upper bits of a register to better effect execution of shorter bit operations. The various functional blocks are interconnected through suitable buses or other interconnects as known in the art. The register file 110 provides data generally shown as 122 to data paths as data is needed.

The control logic 112 provides in some examples, SSE merging control to control merging of data within a register. The control logic 112 also generates the content of the register rename map table 106 and manages the content as described herein. In some implementations, the control logic 112 is implemented as one or more state machines. In other examples, the control logic is implemented as micro code or firmware executing on a microcontroller. However, any suitable structure may be employed.

An instruction cache (not shown) stores instruction set data that is fetched by a fetch unit in response to demand fetch operations as known in the art, or in response to speculative prefetch operations. The decode unit 102 decodes instructions fetched by the fetch unit into one more operations that are to be performed, or executed, by either a floating point unit, fixed point unit, or other processing unit of the processor core 100.

As used herein, a type of instruction refers to a size of the operands manipulated by the instruction. Thus, instructions of different types manipulate operands of different sizes. For example, in some implementations, the processor core 100 and in particular for example, a floating point unit, executes operations decoded from instructions that manipulate 128-bit operands (referred to as 128-bit instructions) and also executes operations decoded from instructions that manipulate 256-bit operands (referred to as 256-bit instructions). In addition, the processor core executes operations decoded from instructions that manipulate 512-bit operands (referred to as 512-bit instructions). The processor core 100 employs the register file 110 that is reconfigured for the different bit width instructions.

In some implementations, the processor core 100 is a core of a graphics processing unit (GPU) and/or central processing unit (CPU) and employs in some examples a floating point unit. For example, if the CPU encounters an instruction that requires performing a floating point operation, the CPU transmits a request to the FPU which carries out the operation and returns the result to the CPU.

In some implementation, the register file 110 utilizes standard latches, additional shadow latches and shadow select muxes as previously described and stores instructions, operands used by the instructions, and results of executed instructions. The entries in the register file 110 are indicated by physical register numbers. In certain implementations, the physical register numbers are mapped (or renamed) using the register rename map table 106 to architectural register numbers that are defined by an instruction set architecture.

In this example, the execution unit 104 which may be as noted above, part of the FPU, operates at a first bit width (128-bit width), a second bit width (256-bit width) and a third bit width which in this example is a full width of 512 bits. The control logic 112 is able to reconfigure the registers of the register file to operate at differing bit lengths by, for example, extending instruction operation or transactions from a single clock cycle to two clock cycles or more depending upon the size of the bit width being processed by the register file. For example, the register file 110 in some implementations, for a 512-bit register file stores the lower 256 bits and regular latches and upper 256 bits in shadow latches and to access the 512 bits occurs over 2, 256-bit cycles, instead of 1 512-bit cycle. However, any suitable configuration may be employed. In some implementations, registers of the register file are 128-bit bits in width and four register elements are used to result in a 512-bit register) see e.g., FIG. 5). For example, two storage latches each of 128 bits wide and two shadow latches each 120 bits wide are employed. However, other configurations may also be employed.

Conventional processors employ register rename map tables that include a mapping of physical register in the register map to architectural registers. Such known systems also use a zero bit, also referred to as a Z-bit, in the entries in the register rename map table. The zero bit is a single bit used to indicate, for example, whether the 511:128 (the bits ranging 511 through 128) from bits of a 512 bit register are all zeros. For example, when the Z bit is set to a "1", the system has detected that all bits 511:128 are 0s in the architectural register and therefor no SSE merging needs to be done on the upper bits. Stated another way, a 128-bit SSE instruction operation has been detected. As such, if the register content before an instruction has zeros in the upper 511:128 bits, the set Z bit indicates that they are 0 bits and no merging operation needs to be performed which reduces power by avoiding merging of upper bits when the processor employs 128-bit operation. However, using the single Z bit operation of conventional system can still result in unnecessary power usage and performance degradation as multiple different bit operands are processed in the processor. Unlike conventional systems, the remap map table 106 contains multiple zero bits and control logic 112 sets the multiple zero bits as described below.

In some implementations the multiple zero bits are set based on zero detection logic 123 which is implemented as a separate functional unit as shown by dashed lines. In this implementation the zero detection logic 123 passes data indicating which of multiple Z bits should be set in the map table. For example, when a write occurs from temporary storage to the register file (via fill routine), the zero detection logic 123 looks at the written data to determine if the specific bit ranges are 0s. In some implementations, restoring data to the register file on a task switch occurs. This is similar to the fill routine, however the data comes from some other architectural external storage. In certain implementations the data passes into the same "zero detection" logic as the temporary storage to register file path.

Figure 2:
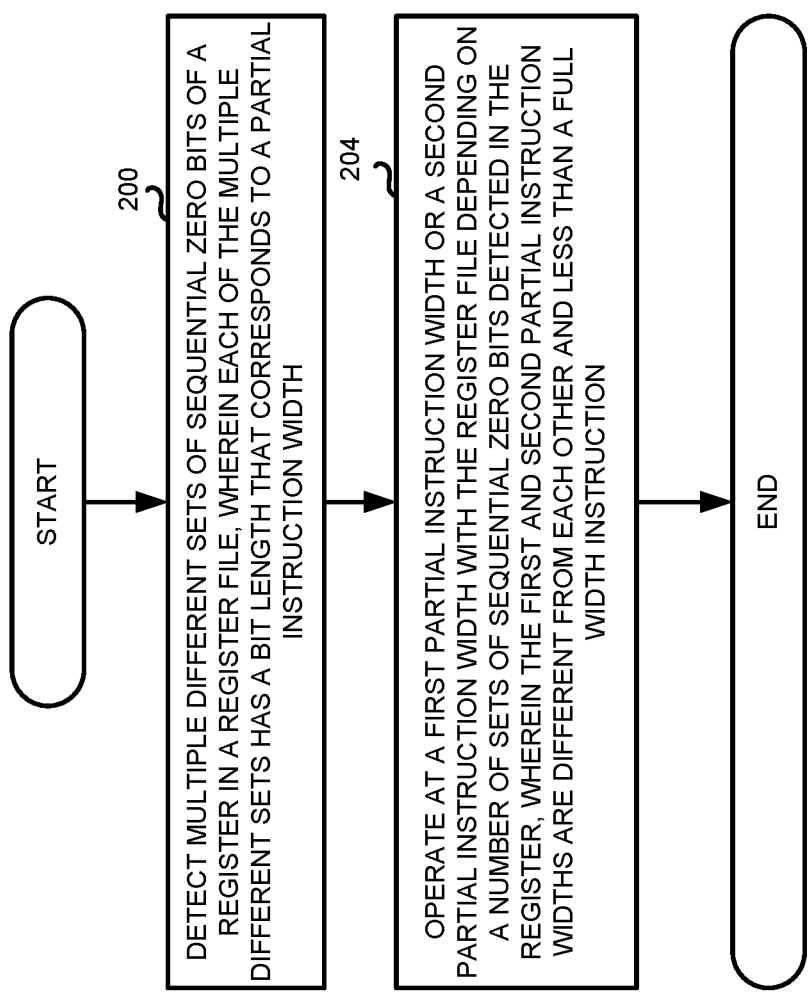
FIG. 2 is a flowchart illustrating one example of a method for executing vector instructions with merging behavior in accordance with one example set forth in the disclosure.

Referring also to FIG. 2, a method for executing vector instructions with merging behavior such that carried out the control logic 112 will be described. As shown in block 200, the method includes detecting multiple different sets of sequential zero bits of a register in a register file. For example, multiple different sets of sequential zero bits may be for example a partial instruction width such as a set of 128 bits or a set 256 bits. The control logic 112 determines for example if a set of 511:256 (of a 512 bit register size) are all zero bits and populates the register rename map table 106 with Z-bit data indicating that this set of bits contain sequential zeros. The control logic 112 also detects another set of bits that contain sequential zero bits such as bits 511:256. If this range of bits contain all sequential zeros, another Z-bit is set in the rename map table 106 resulting in multi-width Z-bit information. Stated another way, two Z bits are stored in the rename map table, as opposed to one in prior systems. Each Z-bit representing a different range or set of bits containing all sequential zeros.

As shown in block 204, the method includes operating a first partial instruction width, such as a 128-bit width operation, or a second partial instruction width, such as a 256-bit operation with the register file 110 depending on a number of sets of zero bits detected in the register. The first and second partial instruction widths are different from each other and less than the full width instruction of 512 bits.

Referring also to FIG. 3, an example of the register rename map table 106 is shown that is generated by the control logic 112. In this example, the register rename map table 106 includes first zero data 300 (Z-bit ZY) representing whether sequential zeros were detected corresponding to a first instruction width, such as 128 bits. The register rename map table 106 also includes second zero data 302 (Z-bit ZZ) representing whether sequential zeros were detected corresponding to a second instruction width, such as a 256-bit operation. The control logic 112 uses the first and second zero data 300 and 302 to operate with the register file 110 in a manner that either merges results or does not merge results depending upon a value of the first and second zero data 300 and 302. The register rename map table 106 includes map table data indicating a plurality of architectural register identifiers 304 and corresponding physical register identifiers 306 that are mapped to each of the plurality of architectural register identifiers 304. The first and second zero data 300, 302 in this example, are each 1 bit and are set for each architectural register and corresponding physical register. However, it will be recognized that more bits may be used if desired.

The Z-bit detection information also referred to as zero bit data, shown as ZY, represents that bits 511:128 are detected to be zeros when the ZY bit is set to a "1". A set "1" indicates that a 128 bit operation has been detected. Zero bit 302 ZZ is set to a "1" when bits 511:256 are detected to be 0. A set "1" indicates that a 256 bit operation has been detected. A "0" for either of these zero detection bits means that non-zeros were detected is a respective range of bits. For example, when operating at a first instruction width, such as performing 128-bit operations, the control logic 112 avoids merging of 128-bit result data in the register since it has been determined that the instruction operation is 128-bit instruction because the ZY bit has been set to a 1. The control logic 112 operates at a second instruction width and avoids merging of bits above 256 bits, for example, when a 256-bit width operation has been detected for execution. For example, if ZZ is set to a 1, the control logic 112 knows that bits 511-256 are all zeros meaning no merging is required and that a 256-bit operation is employed. As such, using multiple Z bits (ZY and ZZ) in the register rename map table allows the control logic 112 to determine different bit width operations that are less than the full 512-bit operations and avoid merging results with 512 bit results in the upper 384 bits of a full 512 register.

In some examples, detecting multiple different sets of sequential zero bits of the register in a register file is determined by an operation's specific function and/or width of a last write instruction to the architectural register, instead of evaluating actual bits of the register. For example, if the last write instruction was a 256-bit operation, the control logic 112 sets ZZ bit 302 to a 1. Similarly, if the last write operation to the register was a 128-bit operation, the ZY bit 300 is set to a 1. As such, the control logic 112 uses the bit width of the last write operation to determine whether to set both zero bits 300 and 302. As such in some implementations, the control logic 112 sets the zero bits 300 and 302 of the register rename map table 106 that identified the detected multiple different sets of bits of sequential zeros by determining the width of a last write operation to the register. In other embodiments, logic is used to track the contents of the physical registers of the register file to determine whether all zeros occur in the ranges indicated. For example, the zero detection logic checks the contents of physical registers after the data is restored or being restored from temporary memory on a task switch. Any other suitable mechanism to detect multiple different sets of sequential zero bits of a register that contain sequential zero bits may also be employed.

Figure 4:
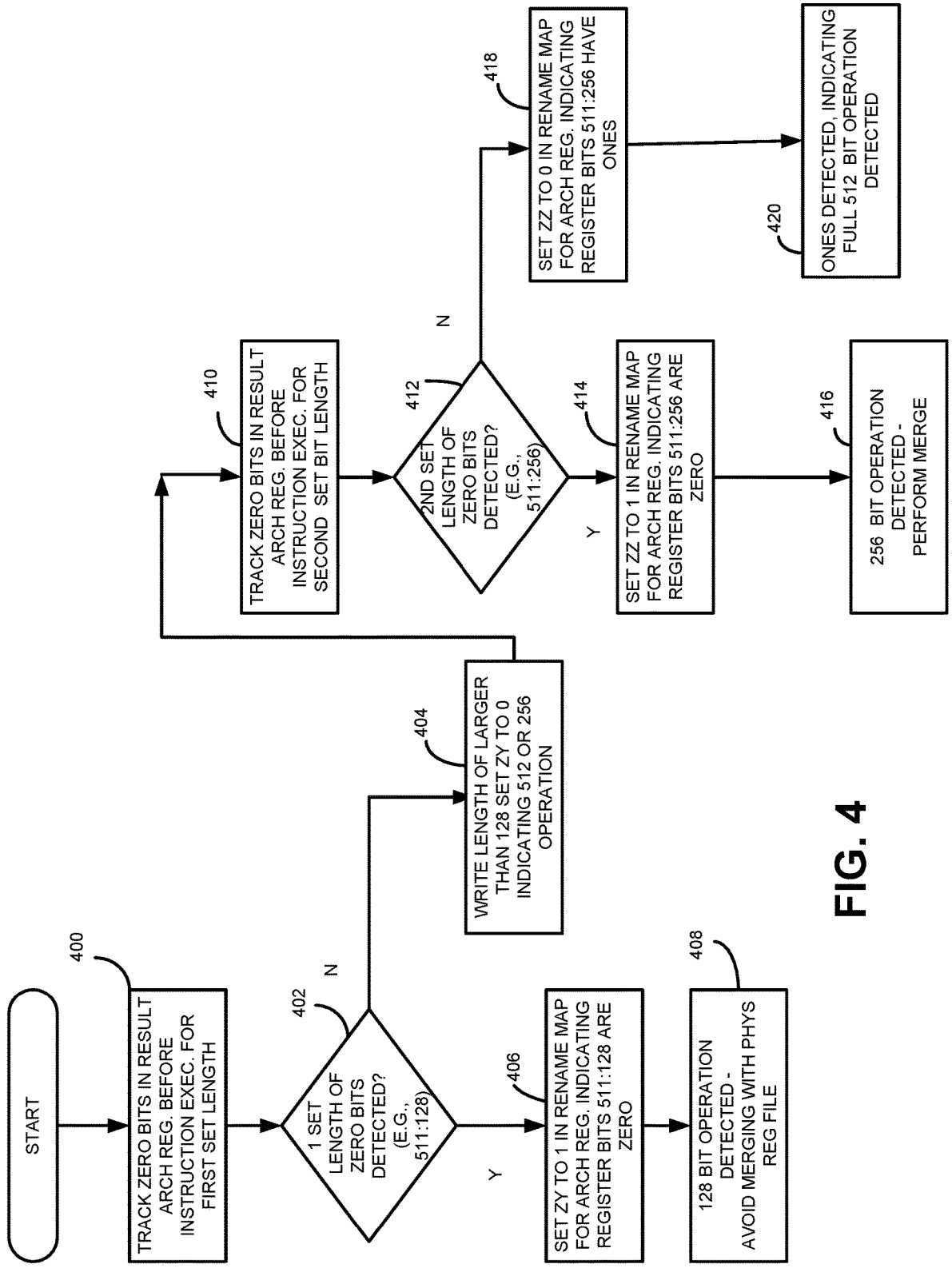
FIG. 4 is a flowchart illustrating one example of a method for executing vector instructions with merging behavior in accordance with one example set forth in the disclosure.

FIG. 4 illustrates an example of a method for executing vector instructions with merging behavior that in some implementations is carried out by the control logic 112. It will be recognized that the operations described herein may be performed in any suitable order and that the control logic and other functional blocks may be implemented in any other suitable functional blocks as desired. As shown in block 400, the method includes tracking zero bits in a first set length in a result of an architectural register before instruction execution. For example, the control logic 112 tracks the size of the last write to an architectural register such as architectural register R0 of FIG. 3. If the size of the last write was 512 bits then Z-bit data 300 is set to a 0 indicating a full width operation and no merging is necessary. However, if the last instruction width was 128 bits, the Z-bit 300 is set to a "1" as shown indicating that bits 511-128 have been detected to be 0 as shown in block 402. Otherwise, as shown in block 404, the Z-bit 300 (ZY) is set to a 0 indicating that there was a 512-bit or 256-bit operation.

Referring back to block 402, when 128-bit operation has been detected meaning that the last write operation was 128 bits, as shown in block 406, the method includes setting the ZY bit 300 to a "1" in the rename map for the architectural register that was evaluated, indicating register bits 511:128 are 0. As shown in block 408, a 128-bit operation has been detected and merging is avoided with the physical register file. There is no writing to the physical register or read during the renaming process. The values of 511:128 in the physical register are ignored.

To set the zero data bit 302, as shown in block 410, the method includes tracking the zero bits of the result in the architectural register for instruction execution for another bit length. In this example, the bit length is 256 bits. In this example, the control logic looks at the last write operation and determines the bit width of the operation and if it is a 256 bit width, the zero data 302 will be set to a "1". The determination is shown in block 412 where it is determined if a second set length of zero bits is detected, namely in this example that effectively bit 511:256 are all zeros. As shown in block 414, if the last instruction written has a width of 256, then the zero data 302 is set to a 1 as shown for architectural R0 indicating a 256-bit instruction has been used. This is shown in block 416. If ZZ is set, but ZY is not set, then the control logic determines that a 256-bit operation was last written and the control logic merges the upper 128-bits of the 256 (255:128) with results in the upper 384 bits. In a processor with the shadow latch scheme, this allows a single-pump operation to do the merging. For example, the control logic does not have to access the shadow latches (containing 511:256). In some implementations, the operation is done in one cycle.

Referring back to block 412, if a second length of sequential zero bits is not detected, the ZZ data 302 is set to a "0" as shown for example with respect to architectural register R1 indicating that bits 511:256 have non-zeros or ones. For example, if the last instruction was not a 256 bit operation, or a 128 bit operation then as shown in block 420, it is determined that a 512 bit operation has been detected. Accordingly, as shown in block 418, the Z-bit ZZ is set to a 0.

As shown in FIG. 3, for example, architectural register R2 has both Z-bits 300 and 302 set to a "0" and as such, a full 512 bit operation is employed and merging occurs. The architectural register R0 is shown as being used in a 128 bit width operation. Architectural register R1 is shown to have a 256 bit width operation detected.

Figure 5:
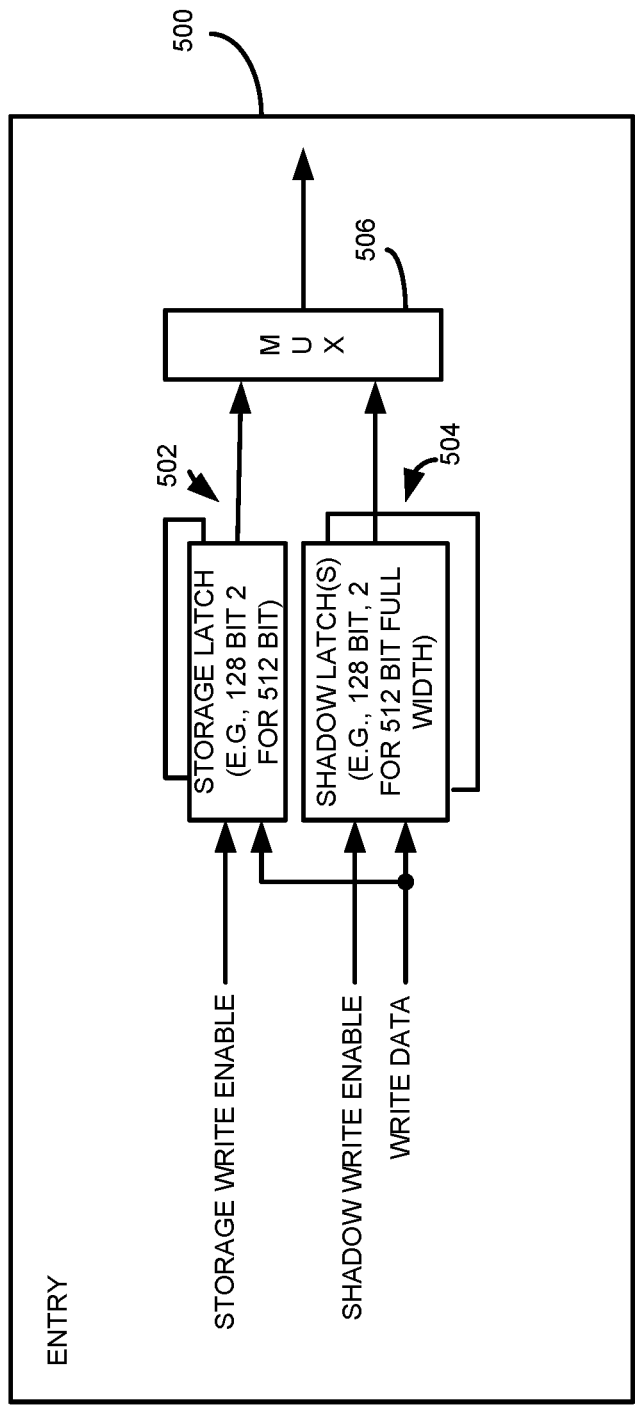
FIG. 5 is a block diagram illustrating one example of a shadow-latch configuration for writing data to a temporary memory in accordance with one example set forth in the disclosure.

FIG. 5 illustrates an entry 500 of the register file in connection with a write operation that is used to carry out a spill to temporary storage 120 if desired. A similar set of read latches, shadow latches and muxes are used to restore the spilled data back into the register file. In this example, the entry 500 includes a shadow-latch structure wherein storage latches 502 are each 128 bits wide and shadow latches 504 are each 128 bits wide. The mux 506 selects which latches are used. As shown a 128 bit wide operation, a 256 bit operation and a 512 bit operation are accommodated.

For example, in some implementations, the control logic moves data from a renamed register to a temporary storage 120 that is external to the register file, when Z-bits 300 and 302 of the register rename map table indicates that there are non-zero bits in both sets of bits and 128 bit instruction is schedule to execute and return data from the register file. If Z-bits 300 and 302 are not set, but no instructions greater than 128 bits are running, then the control logic spill register bits 511:128 to temporary storage 120. The spill is used to move the data out of the renamed physical registers into some other storage. Then these merging instructions can operate at their partial width without having to merge the upper bits since the upper bits are stored in the temporary memory. If an instruction occurs that is greater than a 128-bit instruction, the control logic restores the data by filling the renamed physical registers from temporary storage. As such, the control logic also returns data to the register file from the temporary storage in response to the Z-bits 300 and 302 indicating instruction widths larger than the first bit width instruction are scheduled to execute.

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A processor comprising:
   a register file; and
   control logic operative to:
   detect multiple different sets of sequential zero bits of a register in the register file, wherein each of the multiple different sets has a bit length that corresponds to a partial instruction width; and
   operate at a first partial instruction width or a second partial instruction width with the register file depending on a number of sets of sequential zero bits detected in the register, wherein the first and second partial instruction widths are different from each other and less than a full width instruction.

2. The processor of claim 1 wherein the control logic is operative to cause operating at first instruction width that avoids merging of a first bit length of data in the register and operating at the second instruction width that avoids merging of a second bit length of data in the register.

3. The processor of claim 1 comprising a register rename map table and wherein the control logic is operative to detect multiple different sets of sequential zero bits of the register in the register file by determining at least one of: an operation width and function of a last write operation to the register, and based on the determined last operation width or function, setting zero bits of the register rename map table wherein the zero bits identify the detected multiple different sets of sequential zero bits.

4. The processor of claim 1 comprising:
   a register rename map table; and
   wherein the control logic is operative to:
   generate the register rename map table that comprises first zero data representing whether sequential zeros were detected corresponding to the first instruction width and second zero data representing whether sequential zeros were detected corresponding to the second instruction width; and use the first and second zero data to operate with the register file in a manner that either merges results or does not merge results depending on a value of the first and second zero data.

5. The processor of claim 4 wherein the control logic is operative to generate the register rename map table that comprises map table data indicating a plurality of architectural register identifiers, a physical register identifier mapped to each of the plurality of architectural register identifiers and for each of the plurality of architectural registers, first zero data representing whether sequential zeros were detected corresponding to the first instruction width and second zero data representing whether sequential zeros were detected corresponding to the second instruction width.

6. The processor of claim 3 wherein the control logic is operative to move data from a renamed register to temporary memory external to the register file when the zero bits of the register rename map table indicate that there are non-zero bits in both sets of bits and a first bit width instruction is scheduled to execute and return data to the register file from the temporary memory in response to the zero bit indicating instruction widths larger than the first bit width instruction are scheduled to execute.

7. The processor of claim 6 the control logic is operative to detect multiple different sets of bits from the temporary memory when data is restored to the register file from the temporary memory.

8. A method for executing vector instructions with merging behavior, comprising:
   detecting multiple different sets of sequential zero bits of a register in a register file, wherein each of the multiple different sets has a bit length that corresponds to a partial instruction width; and
   operating at a first partial instruction width or a second partial instruction width with the register file depending on a number of sets of sequential zero bits detected in the register, wherein the first and second partial instruction widths are different from each other and less than a full width instruction.

9. The method of claim 8 wherein operating at first instruction width comprises avoiding merging of a first bit length of data in the register and wherein operating at the second instruction width comprises avoiding merging of a second bit length of data in the register.

10. The method of claim 8 wherein detecting multiple different sets of bits of the register in the register file comprises determining at least one of: an operation's function and width of a last write operation to the register, and based on the last operation width or function, setting zero bits of a register rename map table wherein the zero bits identify the detected multiple different sets of sequential zero bits.

11. The method of claim 8 comprising generating a register rename map table comprising first zero data representing whether sequential zeros were detected corresponding to the first instruction width and second zero data representing whether sequential zeros were detected corresponding to the second instruction width and using the first and second zero data to operate with the register file in a manner that either merges results or does not merge results depending on a value of the first and second zero data.

12. The method of claim 10 wherein generating the register rename map table comprises generating map table data indicating a plurality of architectural register identifiers, a physical register identifier mapped to each of the plurality of architectural register identifiers and for each of the plurality of architectural register identifiers, first zero data representing whether sequential zeros were detected corresponding to the first instruction width and second data representing whether sequential zeros were detected corresponding to the second instruction width.

13. The method of claim 11 comprising moving data from a renamed register to temporary memory external to the register file when the first and second zero data of the register rename map table indicate that there are non-zero bits in both sets of bits and a first bit width instruction is scheduled to execute and return data to the register file from the temporary memory in response to the first and second zero data indicating instruction widths larger than the first bit width instruction are scheduled to execute.

14. The method of claim 13 comprising detecting multiple different sets of bits from the temporary memory when data is restored to the register file from the temporary memory.

15. A processor comprising:
   a floating point unit (FPU) configured to operate at a plurality of different instruction widths, the FPU comprising;
   a floating point register file;
   a register rename map table; and
   control logic operative to:
   detect multiple different sets of sequential zero bits of a register in the floating point register file, wherein each of the multiple different sets has a bit length that corresponds to a partial instruction width, by determining an operation width of a last write operation to the register and based on the last write operation width, setting zero bits of the register rename map table wherein the zero bits identify the detected multiple different sets of bits of sequential zeros; and
   operate at a first partial instruction width or a second partial instruction width with the floating point register file depending on the zero bits in the register rename map table, wherein the first and second partial instruction widths are different from each other and less than a full width instruction.

16. The processor of claim 15 wherein the control logic is operative to cause operating at first instruction width that avoids merging of a first bit length of data in the register and operating at the second instruction width that avoids merging of a second bit length of data in the register.

17. The processor of claim 15 comprising:
   wherein the control logic is operative to:
   generate the register rename map table that comprises first zero data representing whether sequential zeros were detected corresponding to the first instruction width and second zero data representing whether sequential zeros were detected corresponding to the second instruction width; and
   use the first and second zero data to operate with the register file in a manner that either merges results or does not merge results depending on a value of the first and second zero data.

18. The processor of claim 17 wherein the control logic is operative to generate the register rename map table that comprises map table data indicating a plurality of architectural register identifiers, a physical register identifier mapped to each of the plurality of architectural register identifiers and for each of the plurality of architectural register identifiers, first zero data representing whether sequential zeros were detected corresponding to the first instruction width and second zero data representing whether sequential zeros were detected corresponding to the second instruction width.

19. The processor of claim 15 wherein the control logic is operative to move data from a renamed register to temporary memory external to the register file when the zero bits of the register rename map table indicate that there are non-zero bits in both sets of bits and a first bit width instruction is scheduled to execute and return data to the register file from the temporary memory in response to the zero bit indicating instruction widths larger than the first bit width instruction are scheduled to execute.

20. The processor of claim 19 wherein the control logic is operative to detect multiple different sets of bits from the temporary memory when data is restored to the register file from the temporary memory.

\* \* \* \* \*